US006243028B1

(12) United States Patent
Krygler et al.

(10) Patent No.: US 6,243,028 B1
(45) Date of Patent: Jun. 5, 2001

(54) PARKING METER

(76) Inventors: Agenor Krygler; Alicja Krygler, both of Bremer Strasse 53, D-21073 Hamburg (DE)

( * ) Notice: Subject to any disclaimer, the term of this patent is extended or adjusted under 35 U.S.C. 154(b) by 0 days.

(21) Appl. No.: 09/242,150

(22) PCT Filed: Dec. 13, 1996

(86) PCT No.: PCT/EP96/05595

§ 371 Date: Oct. 8, 1999

§ 102(e) Date: Oct. 8, 1999

(87) PCT Pub. No.: WO98/07123

PCT Pub. Date: Feb. 19, 1998

(51) Int. Cl.$^7$ .................................................... B60Q 1/48

(52) U.S. Cl. .................. 340/932.2; 340/934; 340/825.3; 194/217; 194/902; 194/296

(58) Field of Search ................................ 340/932.2, 934, 340/825.3; 194/217, 902, 296

(56) References Cited

U.S. PATENT DOCUMENTS

| | | | | |
|---|---|---|---|---|
| 4,173,272 | | 11/1979 | Von Knorring | 194/9 T |
| 4,379,334 | * | 4/1983 | Feagins, Jr. et al. | 364/467 |
| 4,623,969 | * | 11/1986 | Bensoussan et al. | 364/505 |
| 4,876,540 | * | 10/1989 | Berthon et al. | 340/932.2 |
| 4,949,274 | * | 8/1990 | Hollander et al. | 364/483 |
| 5,065,156 | * | 11/1991 | Bernier | 340/932.2 |
| 5,103,957 | * | 4/1992 | Ng et al. | 194/217 |
| 5,402,475 | * | 3/1995 | Lesner, Jr. et al. | 379/106 |
| 5,617,942 | * | 4/1997 | Ward, II et al. | 194/217 |
| 5,845,268 | * | 12/1998 | Moore | 705/418 |

FOREIGN PATENT DOCUMENTS

| | | |
|---|---|---|
| 3803387 | 8/1989 | (DE) . |
| 0001416 | 4/1979 | (EP) . |
| 2339216 | 8/1977 | (FR) . |
| 2341168 | 9/1977 | (FR) . |
| 2580417 | 10/1986 | (FR) . |
| 8100778 | 3/1981 | (WO) . |

OTHER PUBLICATIONS

Patent Abstracts of Japan, vol. 016, No. 241, (P–1363), Jun. 3, 1992 & JP 04 052 718 A (Toshiba Corp), Feb. 20, 1992.

* cited by examiner

*Primary Examiner*—Daniel J. Wu
*Assistant Examiner*—Tai T. Nguyen
(74) *Attorney, Agent, or Firm*—Friedrich Kueffner

(57) ABSTRACT

A parking meter includes a payment input device, an optical indicating device with optical indicating elements, actuating elements for a corresponding number of parking spaces provided for and interacting with the indicating elements, wherein the indicating elements, the actuating elements and the input device are connected in a common control device. An actuating key labeled "zero" is provided for initiating operation of the parking meter The optical indicating device includes a luminescent diadoe panel with indicating lights. The actuating device includes additional actuating keys. Only one indicating light is provided for each actuating key. A sound reproduction device with a loudspeaker is provided for an acoustic announcement of the paid parking time.

21 Claims, 2 Drawing Sheets

PARKING METER

BACKGROUND OF THE INVENTION

1. Field of the Invention

The invention relates to a parking meter with an input device for means of payment, particularly with a coin slot, and an indicating device for indicating the course of a paid parking time. The invention also relates to a control device for a parking meter.

2. Description of the Related Art

Especially in town centers with dense traffic, the available parking space is often limited. According to the state of the art, so-called parking meters are used to counter long-term parking; they have a slot for coins into which different coins can be inserted, depending on the desired parking time and necessary parking fees. By actuating a turning knob existing on the parking meter, the parking meter releases the selected and paid parking time. A rotating plate, which is connected to a clock, rotates after expiration of the parking time back to a "0-mark" which indicates the expiration of the paid parking time. The disadvantage of these parking meters consists in the quite complicated mechanism which, in addition to this, is susceptible to wear. Even if such parking meters are configured as double parking meters for two parking spaces, finally a time synchronously running mechanism is respectively required per parking space.

In many towns and municipalities, parking ticket issuing machines are used besides parking meters. These parking ticket issuing machines activate, after insertion of a certain amount of money and selection of the desired parking time, a printing unit which outputs the parking time resulting from the paid fees as final parking time. With this system, the parking space user is instructed to place the issued parking ticket inside the motor vehicle so as to be visible in such a way to allow to check if the parking time is exceeded. This method is quite troublesome for the parking space user since he has to cover the way there and back from the vehicle to the parking ticket issuing machine before he can lock the vehicle and leave the parking space. In addition, when being placed into the vehicle, the parking tickets are blown away from the instrument panel, where they always have to be placed, by external blast or already by slamming the door and lay on the floor of the vehicle, unrecognizable if they are to be checked. The parking ticket issuing machines also are complicated since they must comprise an electrically drive printing unit.

Moreover, it is known by the german model of utility 296 06 229 to provide a parking ticket issuing machine for each parking space with a supplementary housing with a window for the insertion of a parking ticket.

SUMMARY OF THE INVENTION

The aim of the present invention is to make available a parking meter and a device for its control of the above stated type, whereby the above mentioned disadvantages are eliminated, the construction of the parking meter should be improved and simplified and the handling thereof should be easier also for the checking personnel.

According to the invention, the indicating device has at least two visual or acoustic indicating means for a corresponding number of parking spaces, whereby an actuation element is operationaly connected to the coordinated indicating element and whereby all indicating means, the actuating element and the input device for means of payment are connected to a common control device. The selected memorized and paid parking time is acoustically confirmed and has thus the function of a receipt. The running parking time is visually or acoustically indicated by the indicating means.

This has the advantage that no receipts, which have to be placed in the parking vehicle in the area of the windscreen, have to be issued any more.

Preferable further developments of the parking meter are described in the subclaims.

The result is a particularly simple, inexpensive and efficient construction when the parking meter has a columnar or box-type casing, whereby the actuating element is a rotary valve, the indicating elements are luminescent diodes, the indicating device is a luminescent diode field, the control device has at least one clock, particularly one electronic clock which is respectively connected to the indicating elements, the control device has a keyboard which has the actuating element, the actuating element having at least two keys, and whereby a key is assigned to each indicating element and/or the keys are key buttons with spring elements or touch contact keys or sensors or proximity switches.

For increasing the reliability of operation and for avoiding fraud or manipulation attempts, the input device for means of payment advantageously has a test device, especially a coin acceptor unit To increase the operating convenience and to facilitate the operation, the parking meter furthermore has a sound reproduction device which preferably acoustically indicates a paid parking time and which particularly is a speech module.

Preferably, the control device has at least one clock, especially one electronic clock which is connected respectively to the indicating elements. Advantageously, one clock, especially one electronic clock, is provided for each parking space.

A parking meter which is particularly convenient and reliable for operation results from the fact that the control device has a microprocessor system which is connected to the input device for means of payment and to the indicating means. The control device has at least one clock, especially one electronic clock which is connected to the microprocessor system. Advantageously, one clock, especially one electronic clock, is provided for each parking space.

Preferably, the input device for means of payment has a sensor which gives a signal to the control device when means of payment are being input.

Preferably, the input device for means of payment has additionally an actuating element which relases, when actuated, the return of input means of payment.

For an optimal sytem operation with defined conditions, the parking meter is provided with an actuating element which initializes the parking meter into a predetermined initial state.

For a control device of the above stated type, it is provided for according to the invention that this control device has the following: a microprocessor system which is connected to a time measuring device, input means for means of payment, at least two indicating means for indicating the expiration of a paid parking time and an input device for the selection of an indicating device.

Preferable further developments of the parking meter and of the control device are described in the subclaims.

Thus, it results in a simple, inexpensive device which is reliable for operation because the time measuring device is an electronic clock, the input device for means of payment is a coin slot, the input device for the selection of an indicating element is a keyboard, the input device for the selection of an indicating element has at least two keys, whereby a key is assigned to each indicating element, the keys are key buttons with spring elements or touch contact keys or sensors or proximity switches, the input device for the selection of an indicating element is a rotary valve, the indicating elements are luminescent diodes, particularly a luminescent diode field and/or a separate time measuring device is provided for each parking space.

An increased reliability for operation and a protection against fraudulous handling is obtained by the fact that the input device for means of payment has a test device, especially a coin acceptor unit.

An additional support for the user and a corresponding comfort improvement for the operation is obtained by the fact that the parking meter has a sound reproduction device which is connected to the microprocessor system. The sound reproduction device indicates, preferably acoustically, a paid parking time. The sound reproduction device is preferably a speech module.

Preferably, the input device for means for payment has a sensor which gives a signal to the microprocessor system when means of payment have been input into the device.

Preferably, the input device for means of payment has an actuating element which releases the return of input means of payment when actuated.

To obtain the operation with initial conditions defined at any time, there is an actuating element which initializes the control device into a predetermined initial state.

BRIEF DESCRIPTION OF THE DRAWINGS

The invention will be explained in detail below with reference to the attached drawings.

DETAILED DESCRIPTION OF THE INVENTION

Figure 1:
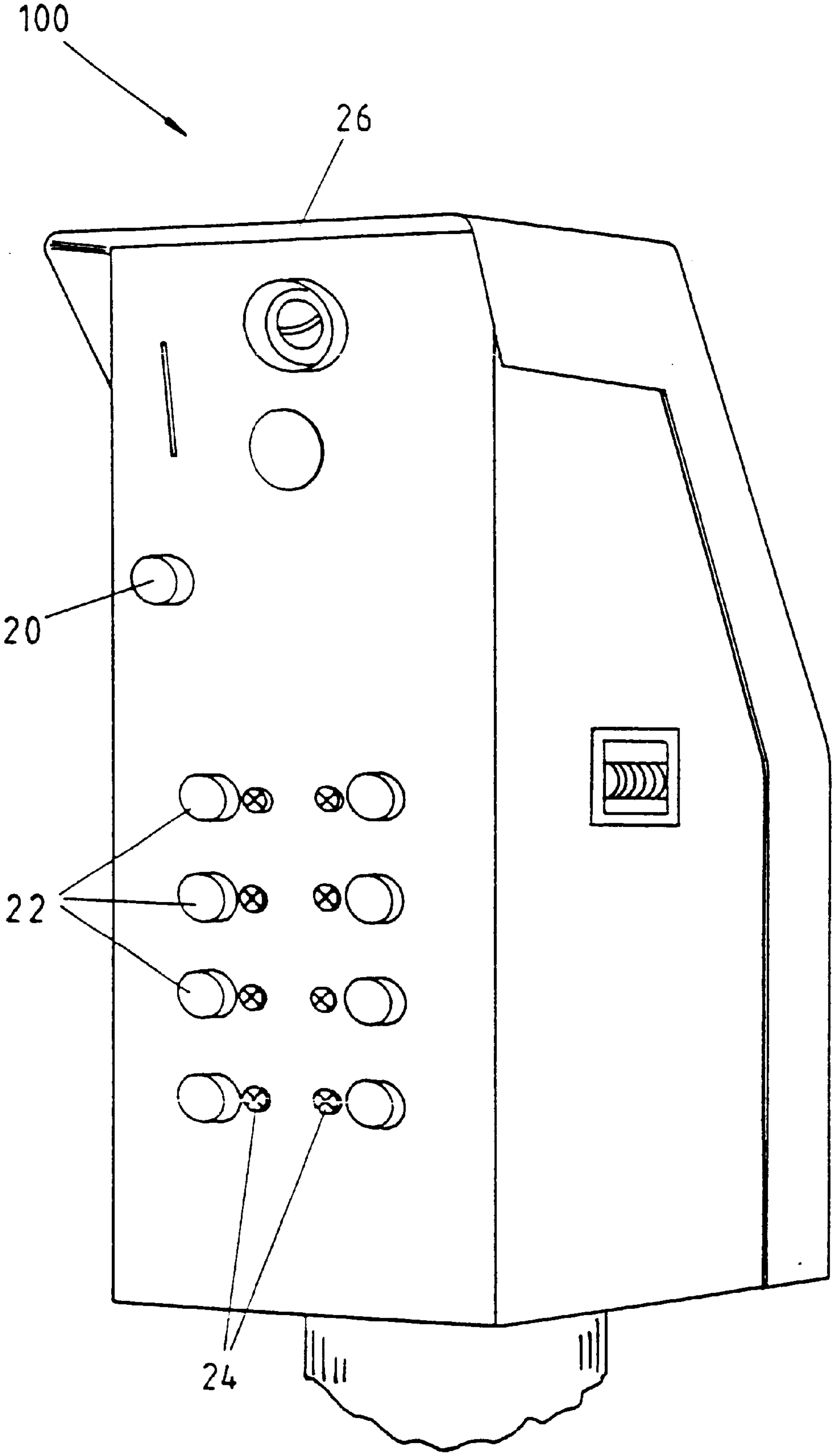
FIG. 1 shows an exploded view of a parking meter according to the invention.

FIG. 1 shows an exploded view of a parking meter according to the invention 100 with actuating keys 22, a zero key 20, flashlights 24 and a small shed 26 for the protection against atmospheric influences.

Figure 2:
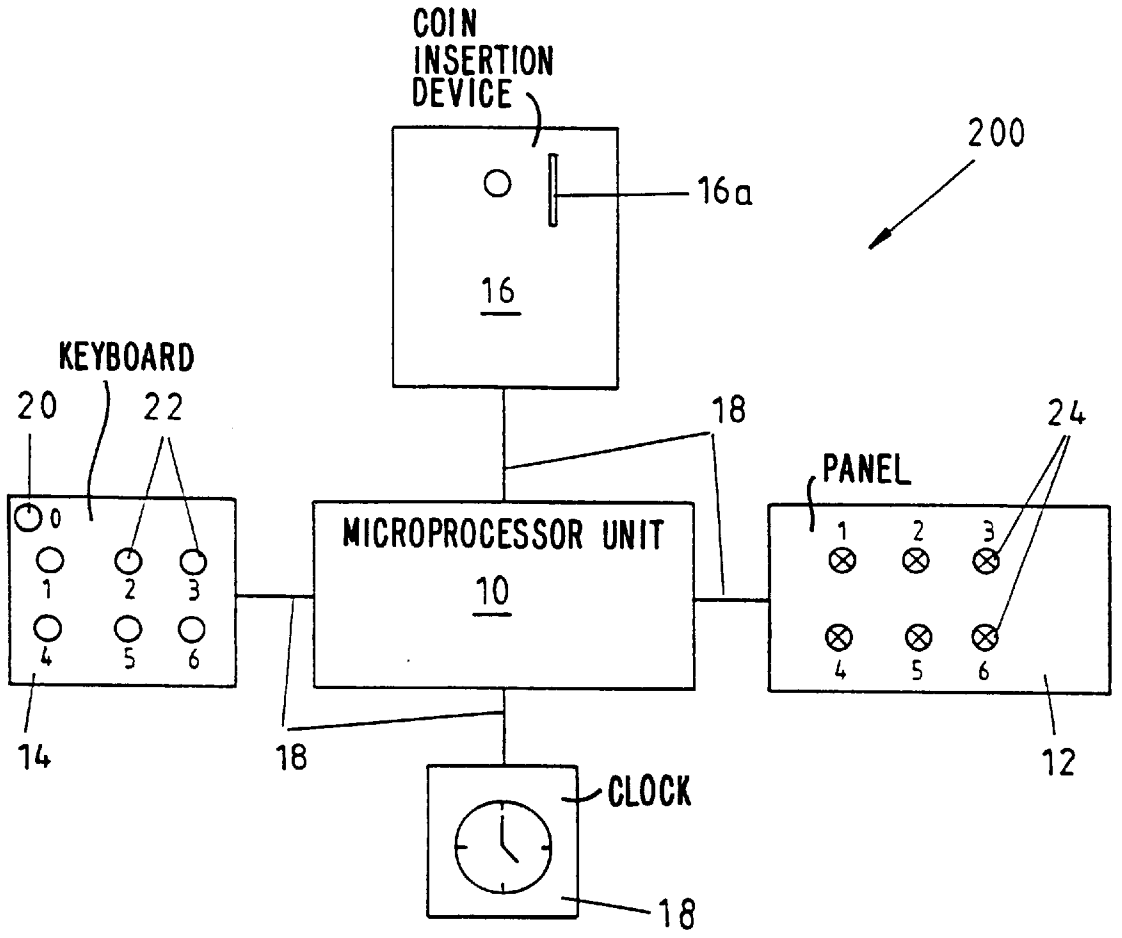
FIG. 2 shows a schematic logic diagram of a control device according to the invention for a parking meter.

FIG. 2 shows a schematic logic diagram of a control device according to the invention 200 for a parking meter 100. This parking meter shows a central microprocessor unit 10, a coin insertion device 16 with a coin insertion slot 16*a,* a keyboard 14 with actuating keys 22, a luminescent diode panel 12 with flashlights 24 and an electronic clock 18. The microprocessor unit 10 is connected to the other components preferably over a data transmission network with data busses 18. Moreover, there is also a zero key 20.

The keyboard 14, as a manually actuatable mechanism for this electronic control system 200, is constituted by keys with microswitches which are placed directly on the board 14 with electronic contact to the microprocessor 10. Spring elements can be between keys and microswitches. However, touch contact keys (sensors) can also be used. The microswitches serve as communication of the electronic system 200 with the keys. The actuating keys 20, 22 are designed for example as spring loaded push keys or as touch contact keys.

Besides, the microswitches the system 200 can have a photocell or a microswitch which receives a signal of the coin insertion device 16 over a spring loaded lever.

The input or data input components of this system 200 are the keyboard 14, the coin insertion device 16 and the timing unit (electronic clock) 18. The luminescent diode panel is the output or indicating component.

An acoustic or a visual indicating element 24 is assigned to each actuating key 22. The number of the actuating keys 22 with the indicating elements 24 corresponds to the number of the parking spaces to be operated. The parking meter 100 can be designed for the operation of one parking space as well as for the operation of several parking spaces.

The electronic system of the parking meter is characterized by the microprocessor system which is connected to the mechanic device in form of a coin loader and of an electronic clock, whereby a keyboard is connected to the system input and a diode luminescent board is connected to the system output.

The key marked with "zero" has to be actuated before coin insertion. Thereafter, one or several coins are inserted into the coin slot. Thereafter, among the series of numbers "1 to 8", the key of the number which coincides with the correspondingly numbered parking space has to be pressed. If one parks on space "5", the key with the number "5" has to be pressed. If this key is pressed, an acoustic announcement of the parking time is made over an integrated loudspeaker. This acoustic announcement is simultaneously the confirmation that the charge has been paid for the corresponding parking time. If an indication of "30 minutes" is acoustically announced, the parking time is only 30 minutes. However, the acoustic announcement can announce other parking times if, for example, two coins have been inserted and it then results a parking time of "60 minutes".

Besides each key with the numbers "1 to 8", there is a visual signal light (flashing light). When pressing the key, the occupant of the parking space "5" not only releases the acoustic announcement but also simultaneously the flashing light is actuated, as soon as the parking time charge is confirmed. This visual signal is provided for persons (checking personnel or municipal superintending authorities) which check the parking meters. If the light corresponding to the key with the number "5" flashes, the checking person knows that the charge for this parking space n° "5" has been paid and also that the parking time has not yet expired.

This flashing light is on as long as the parking time runs.

The number of the keys "1 to 8" may be any number. For example, keys "1 to 12" may also be provided for.

The acoustic announcement takes place over a speech module placed in the inner part of the casing of the parking meter. This speech module has to be connected to the coin counter when inserting the coins and additionally to each individual key from the series of keys "1 to 8" since, depending on the number of the inserted coins, the announcement has to indicate the corresponding parking time, i.e. by inserting one one-mark coin, a parking time of 30 minutes will be acoustically anounced. When inserting two coins, after having actuated the key "5" the acoustic announcement indicates that a 60 minutes parking time is available.

The acoustic announcement of the duration of the parking time can also occur over a carrier system like for example a sound reproduction device which is installed in the parking meter. For such a sound reproduction device, the corresponding announcement is for example contained on a tape which is then played.

Instead of button keyboards, other types of press switches can also be used like, among others, proximity switches.

The advantage of the new parking meter especially consists in the fact that no receipts which have to be placed in the parking car in the area of the windscreen are issued any longer. The parking space visitor parks his car and actuates the parking meter and, when the parking meter validates quasi acoustically the paid parking time, the parking space user does not need to go back to his car, since he has already received the receipt from the parking meter and every inspector finds the visual confirmation at the parking meter, even at a bigger distance, that the parking charge has been paid for a certain time. The unending running to and fro concerning the charge confirmation for the known parking systems is eliminated. For the new parking system there is no need for printing black or paper reel stock.

The parking meter can also contain a coin acceptor unit. False coins are not returned. Preferably, a coin acceptor unit is activated after each coin insertion. Optionally, it can be provided for that false coins are kept from the start, which allows to avoid several attempts of parking meter manipulations with foreign currency coins which are similarly big or similarly heavy but which have a lower value or to avoid that these attempts of parking meter manipulations finally create a coin congestion in the coin slot. The parking space user is discouraged, from the start, to try such attempts by an indication on the parking meter noticing that inappropriate coins will be kept without return possibility. Alternatively and as basically known by the prior art, a coin return key with a corresponding removal pit can be provided for. Naturally, the described parking meter may also be combined to a money changer, for instance if the parking fee to be paid corresponds respectively to a coin which is not so often commonly used.

The coin acceptor unit which preferably exists in the parking meter is such designed that, when operating a money return key or a coin acceptor unit activating switch, only coins for which the parking meter is designed are returned. Foreign currency coins or false money are not returned when actuating the money return key, but remain in the parking meter.

What is claimed is:

1. A parking meter comprising an input device for means of payment, an optical indicating device with optical indicating elements, actuating elements for a corresponding number of parking spaces provided for and interacting with the indicating elements, wherein the indicating elements, the actuating elements and the input device are connected in a common control device, further comprising an actuating key labeled “zero” for initiating operation of the parking meter, wherein the optical indicating device comprises a luminescent diode panel with indicating lights, wherein the actuating device includes additional actuating keys, wherein only one indicating light is provided for each actuating key, further comprising a sound reproduction device with a loudspeaker for an acoustic announcement of the paid parking time.

2. The parking meter according to claim 1, comprising a columnar or box-like housing.

3. The parking meter according to claim 1, wherein the input device includes a testing device.

4. The parking meter according to claim 3, wherein the testing device is a coin acceptor unit.

5. The parking meter according to claim 1, wherein the sound reproduction device is a speech module.

6. The parking meter according to claim 1, wherein the control device includes a keyboard provided with an actuating element.

7. The parking meter according to claim 1, wherein each actuating key is one of a key button with spring elements and touch contact keys and sensors and proximity switches.

8. The parking meter according to claim 7, wherein the keys are connected to microswitches.

9. The parking meter according to claim 1, wherein each actuating element is a rotary valve.

10. The parking meter according to claim 1, wherein the indicating device has three or more indicating elements for three or more parking spaces.

11. The parking meter according to claim 1, wherein the indicating device includes six or more indicating elements for six or more parking spaces.

12. The parking meter according to claim 1, wherein the indicating device includes twelve or more indicating elements for twelve or more parking spaces.

13. The parking meter according to claim 1, wherein the control device includes at least one electronic clock connected to the indicating elements.

14. The parking meter according to claim 13, comprising an electronic clock for each parking space.

15. The parking meter according to claim 1, wherein the control device comprises a microprocessor system connected to the input device and the indicating elements.

16. The parking meter according to claim 15, wherein the control device has at least one electronic clock connected to the microprocessor system.

17. The parking meter according to claim 1, wherein the a clock is provided for each parking space.

18. The parking meter according to claim 17, wherein the clock is an electronic clock.

19. The parking meter according to claim 1, wherein the input device comprises a sensor for providing a signal to the control device when means of payment are put into the input device.

20. The parking meter according to claim 1, wherein the input device further comprises an actuating element which when actuated releases a return of input means of payment.

21. The parking meter according to claim 1, wherein the parking meter comprises an actuating element for initializing the parking meter into a predetermined initial state.

* * * * *